Patented July 21, 1953

2,646,349

UNITED STATES PATENT OFFICE 2,646,349

LIGHT DISTILLATE COMPOSITIONS

Don A. Wagner, Highland, Ind., assignor to Sinclair Refining Company, New York, N. Y., a corporation of Maine No Drawing. Application July 26, 1949,
Serial No. 106,982

5 Claims. (Cl. 44—62)

This invention relates to light oil compositions containing a corrosion inhibitor and, more particularly, to light oil products to which have been added a small amount of sulfurized tall oil. My invention also includes a method of inhibiting the corrosive effects of light oil products by adding thereto a relatively small proportion of sulfurized tall oil.

The storage, transportation, and use of light oil products create serious corrosion difficulties by reason of the contact of the inevitably associated moisture with the oxidizable metals normally used in handling and containing these materials in bulk. The problem is of considerable magnitude when one considers the vast quantity of light oil products contacted with such metal surfaces which are readily susceptible to rusting. The pipe lines used for transporting oil products are exemplary. As a result many so-called corrosion inhibitors have been proposed for use in these products in an attempt to reduce or eliminate this adverse effect. In most instances, unfavorable economic conditions of cost and availability, adverse chemical and physical characteristics, or the lack of effective protection make many of these additives impractical.

I have discovered the addition of a small amount of sulfurized tall oil to light oil products provides a particularly effective and economical means for protecting metallic surfaces in contact with these compositions against corrosion. The sulfurized tall oil is formed by reacting sulfur with a crude tall oil at elevated temperatures; the reaction product is then added to the oil.

By light oil products I mean relatively non-viscous petroleum distillates, that is to say, petroleum distillates of a viscosity not exceeding that of gas oil. My discovery particularly contemplates the incorporation of sulfurized tall oil in light oil products such as the more commonly used fuels, e. g., gasoline, kerosene, and light furnace oils. Crude tall oil is a mixture of fatty and rosin acids formed as a by-product in the process of manufacturing paper from pine wood. The chemical composition of crude tall oil is not very well known and, further, varies considerably, depending upon the source of the product. However, it may generally be characterized as a mixture containing about 45% to 50% of fatty acids, about 42% to 48% of rosin acids, and about 6% to 9% of sterols, higher acids, etc. Crude tall oil is low in cost and readily obtainable in substantial quantities. Sulfurization of the crude tall oil is productive of a composition generally acidic in nature which is characterzed by its insolubility in water and, further, ts favorable demulsifying properties. Thus sulfurized tall oil cannot readily be leached out and because of its satisfactory film-forming properties, affords protection of a more permanent nature.

Sulfurized tall oil is most advantageously produced by reacting a crude tall oil with a small proportion of sulfur at elevated temperatures. The crude tall oil and sulfur are heated to, say, 350° F. for a period of time, for instance, four hours. Hydrogen sulfide is generally evolved in the reaction. Where larger quantities of sulfur are used, the reaction is noticeably exothermic and external cooling is required to maintain the desired temperature and prevent excessive heating. Following the reaction period, the temperature is lowered and the product filtered. To aid filtration, a material of the nature of toluene may be employed as well as a filter aid. The solution is then filtered and the toluene is easily removed via topping by vacuum means.

The quantity of sulfur reacted with the crude tall oil may be varied greatly and is dependent in large measure upon the light oil product into which the corrosion inhibitor is to be incorporated. Generally speaking, the sulfur to crude tall oil ratio by weight is about 5:100 to about 40:100. About 5% to 25% sulfur on the weight of the crude tall oil is most effective. At higher sulfur levels the sulfurized tall oil composition usually becomes very viscous and is therefore difficult to handle. However, this condition may be readily overcome upon the addition of a suitable solvent, such as toluene, to make the sulfurized tall oil product more fluid.

The proportion of sulfurized tall oil incorporated in a light oil product for effective protection is ordinarily very small, but may be varied over a relatively wide range. The precise amount is determined generally by the nature and ultimate use of the oil product. Preferably, the amount may be varied from 1 to 50 pounds for each 1,000 barrels of the oil product treated. In some cases higher concentrations may be used. Generally speaking, in a gasoline the concentration may be varied in the range of 1 to 15 pounds per 1,000 barrels of gasoline. A concentration of 3 to 12 pounds of sulfurized tall oil per 1,000 barrels of gasoline will be highly effective, while amounts as low as about 1.5 pounds per 1,000 barrels will inhibit rust formation to a great extent and generally limit rust formation to less than 5% of the area of a ferrous metal surface with which it is in contact. Kerosene and light fuel oil concentrations are preferably in the range of 1 to 20 pounds per 1,000 barrels. In particular, kerosene containing 6 to 8 pounds of the corrosion inhibitor per 1,000 barrels is highly satisfactory, while with light fuel oils 6 to 15 pounds per 1,000 barrels yield excellent results.

By way of illustration the following examples show the preparation of a sulfurized tall oil according to my invention. In each of the examples a crude tall oil analyzing as follows was used:

| | |
|---|---|
| Acid number | 160–170 |
| Saponification number | 165–170 |
| Rosin acid number | 80–90 |
| Iodine number (Wijs) | 140–150 |
| Ash content less than, wt. % | 0.40 |

Example A 1222 grams of crude tall oil from which the settled solid material had been removed and 184 grams of sulfur (15% by weight on the crude tall oil) were placed in a three-liter three-neck flask, which was equipped with a reflux condenser, stirrer, and thermometer. The mixture was heated for four hours at 350° F. while being stirred. The temperature was then reduced and the product was dissolved in 1300 cc. of toluene to facilitate filtration. 250 grams of an acid-washed bentonitic clay were added and stirred with the product for ten minutes at 190° F. The mixture was then filtered and the solution was transferred to a Claisen flask and the toluene removed by topping at an absolute pressure of 20 mm. of mercury at a bottoms temperature of 200° F. A yield of 1243 grams of sulfurized tall oil was obtained. The product was a dark brown viscous liquid which contained 9.7% sulfur by weight. The acid and saponification numbers were approximately 131.9 and 176.3, respectively.

Example B 1500 grams of crude tall oil and 75 grams of sulfur (5% by weight on the crude tall oil) were placed in a three-liter three-neck flask, which was equipped with a reflux condenser, stirrer, and thermometer. The mixture was heated at 350° F. for four hours while being stirred. Hydrogen sulfide was evolved during the reaction. The temperature was then reduced and the product was dissolved in 1200 cc. of toluene to facilitate filtration. 30 grams of an acid-washed bentonitic clay were added and stirred with product for ten minutes at 190° F. 15 grams of filter aid were then added and the toluene solution was filtered. This solution was transferred to a Claisen flask and the toluene was removed by topping at an absolute pressure of 20 mm. of mercury at a bottoms temperature of 200° F. A yield of 1350 grams of sulfurized tall oil was obtained. The product was a dark brown viscous liquid, contained 3.79% sulfur, and had an acid number of approximately 156.9.

Example C 1500 grams of crude tall oil and 225 grams of sulfur (15% by weight on the crude tall oil) were placed in a three-liter three-neck flask, which was equipped with a reflux condenser, stirrer, and thermometer. As the temperature was increased to 320° F., the reaction became very exothermic with the rapid evolution of hydrogen sulfide and it was necessary to apply external cooling. The mixture was then heated for four hours at 350° F. while being stirred. The temperature was then reduced and the product was dissolved in 1200 cc. of toluene to facilitate filtration. 30 grams of an acid-washed bentonitic clay were added and stirred with the product for ten minutes at 190° F. 25 grams of filter aid were added and the toluene solution filtered. The solution was transferred to a Claisen flask and the toluene was removed by topping at an absolute pressure of 20 mm. of mercury at a bottoms temperature of 200° F. A yield of 1410 grams of sulfurized tall oil was obtained. The product was a dark brown viscous liquid which contained 9.25% sulfur by weight.

Example D 1200 grams of crude tall oil were sulfurized with 300 grams of sulfur (25% by weight on the crude tall oil). The tall oil and an initial portion of 150 grams of the sulfur were placed in a three-liter three-neck flask, which was equipped with a reflux condenser, stirrer, and thermometer. As the temperature was increased to 320° F., the reaction became very exothermic with the rapid evolution of hydrogen sulfide and it was necessary to apply external cooling. When the foaming and rapid evolution of hydrogen sulfide subsided, the remaining 150 grams of sulfur were added and the mixture was heated for four hours at 350° F. The temperature was then reduced and the product was dissolved in 1200 cc. of toluene to facilitate filtration. 30 grams of an acid-washed bentonitic clay were added and stirred with the product for ten minutes at 190° F. 25 grams of filter aid were then added and the toluence solution filtered. This solution was transferred to a Claisen flask and the toluene removed by topping at an absolute pressure of 20 mm. of mercury at a bottoms temperature of 200° F. A yield of 1300 grams of sulfurized tall oil was obtained as a dark brown viscous liquid. The product contained 12.77% sulfur and had an acid number of approximately 100.

These preparations were incorporated in various light oil products, namely, a regular grade finished gasoline, a premium grade finished gasoline, a kerosene, a No. 1 fuel oil, and a No. 2 fuel oil, so as to illustrate the corrosion prevention effected by sulfurized tall oil.

The following examples illustrate these various light oil product compositions, and the effects of varying amounts of the corrosion inhibitor incorporated therein. The blends were evaluated by means of the modified ASTM D-665-46T Turbine Oil-Distilled Water Rust Test. Essentially, the tests were performed by suspending a polished, mild steel strip in a beaker fitted with a mechanical stirrer and containing 350 ml. of the test blend. The blend was then stirred for thirty minutes, after which 50 ml. thereof was removed and 30 ml. of distilled water substituted. Stirring was continued for 48 hours and the strip then inspected for rust. The tests were carried out at room temperature. To facilitate identification of the efficacy of the finished product under these tests, this rating system was used to identify the degree of rust prevention:

A = No rust
B++ = No more than 12 small rust spots
B+ = Up to 5% of surface rusted
B = 5 to 25% of surface rusted
C = 25 to 50% of surface rusted
D = 50 to 75% of surface rusted
E = 75 to 100% of surface rusted

Example I

A sulfurized tall oil was incorporated in regular grade and premium grade finished gasolines.

Before the addition of the corrosion inhibitor, the gasolines had the following characteristics:

|  | Regular Gasoline | Premium Gasoline |
|---|---|---|
| Gravity, °API | 64.6 | 62.0 |
| Distillation, 100 cc.: |  |  |
| IBP, °F | 98 | 93 |
| E. P., °F | 386 | 395 |
| Reid Vapor Pressure at 100° F | 9.3 | 10.0 |
| Sulfur, Wt. Percent | 0.045 | 0.050 |
| ASTM Gum Content | 2.6 | 3.1 |
| Stability, ASTM | 570 | 530 |

The preparations of examples A, B, and D, were then incorporated into the finished gasolines in amounts and with results as follows:

| Quantity, Pounds Per 1,000 Barrels | Regular Gasoline—Preparation of, Example— | | | Premium Gasoline—Preparation of, Example A |
|---|---|---|---|---|
|  | A | B | D |  |
|  | Rating | Rating | Rating | Rating |
| 0 | E |  |  | D |
| 2½ | B+ |  |  |  |
| 3 | B++ | B+ | B+ | B+ |
| 5 | B++ |  |  | B++ |
| 6 | A | B++ | A | A |
| 8 |  |  |  | A |
| 12 | A | A |  |  |

The sulfurized tall oil did not affect materially the specification of the gasoline blends. Copper strip corrosion tests at 122° F. for three hours were satisfactory.

*Example II*

A sulfurized tall oil was incorporated in kerosene. Before addition of the corrosion inhibitor the kerosene had the following characteristics:

Gravity, °API _____ 47.4
Color, NPA _____ 30+
Distillation, 100 cc.:
  IBP, °F _____ 360
  E. P., °F _____ 499
Odor, Satisfactory.
Copper strip corrosion test at 122° F. for three hours, Satisfactory.

The preparations of Examples A and C were then incorporated into the kerosene in amounts and with results as follows:

| Quantity, Pounds Per 1,000 Barrels | Preparation of Example A | Preparation of Example C |
|---|---|---|
|  | Rating | Rating |
| 0 | D |  |
| 5 | B+ | B+ |
| 6 | B++ | B+ |
| 8 | A | B++ |
| 10 | A |  |
| 15 | A |  |

*Example III*

A sulfurized tall oil was incorporated in light furnace oils. Before addition of the corrosion inhibitor, the fuel oils had the following characteristics:

|  | No. 1 Fuel Oil | No. 2 Fuel Oil |
|---|---|---|
| Gravity, °API | 41.9 | 39.1 |
| Flash, P-M | 148 | 150 |
| Viscosity at 100° F., S. U. S | 31 | 35 |
| Pour Point, °F | below 10 | 0 |
| Color, Saybolt | +19 | −1 |
| Distillation, 100 cc.: |  |  |
| IBP, °F | 360 | 350 |
| E. P., °F | 564 | 668 |

The preparations of Examples A and C were then incorporated into the fuel oils in amounts and with results as follows:

| Quantity, Pounds Per 1,000 Barrels | No. 1 Fuel Oil Preparation of— | | No. 2 Fuel Oil Preparation of Example A |
|---|---|---|---|
|  | Ex. A | Ex. C |  |
|  | Rating | Rating | Rating |
| 0 | D |  | D |
| 3 | B+ |  |  |
| 5 | B+ | B++ |  |
| 6 | B++ | B+ | B+ |
| 8 | A | B++ | B++ |
| 10 | A |  | B++ |
| 12 | A |  | B++ |
| 14 | A |  |  |
| 15 | A |  | A |

I claim:

1. A composition of matter comprising predominately a light oil product and containing a relatively small proportion of the reaction product of sulfur and crude tall oil.

2. A composition of matter as in claim 1 wherein the reaction product is formed by reacting crude tall oil with 5% to 25% of sulfur as based on the weight of the crude tall oil.

3. A composition of matter comprising predominantly a gasoline and containing a relatively small proportion of a sulfurized tall oil.

4. A composition of matter comprising predominantly a light oil product and containing 1 to 50 pounds of sulfurized tall oil per 1,000 barrels of the light oil produced.

5. A gasoline containing 3 to 12 pounds of a sulfurized tall oil per 1,000 barrels.

DON A. WAGNER.

References Cited in the file of this patent

UNITED STATES PATENTS

| Number | Name | Date |
|---|---|---|
| 2,431,737 | Davis | Dec. 2, 1947 |

OTHER REFERENCES

Chemical Abstracts, vol. 32, 1938, pg. 8800.